United States Patent
Yi et al.

(10) Patent No.: US 9,986,486 B2
(45) Date of Patent: May 29, 2018

(54) DATA TRANSMISSION METHOD ACCORDING TO BATTERY USE PATTERN

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Yunjung Yi, Seoul (KR); Okyoung Choi, Daejeon (KR); Song Chong, Seoul (KR); Jeongho Kwak, Daejeon (KR); Joonkui Ahn, Seoul (KR); Byunghoon Kim, Seoul (KR)

(73) Assignees: LG ELECTRONICS INC., Seoul (KR); INDUSTRY-ACADEMIC COOPERATION FOUNDATION, Seoul (KR)

( * ) Notice: Subject to any disclaimer, the term of this patent is extended or adjusted under 35 U.S.C. 154(b) by 0 days. days.

(21) Appl. No.: 15/103,202

(22) PCT Filed: Jan. 5, 2015

(86) PCT No.: PCT/KR2015/000065
§ 371 (c)(1),
(2) Date: Jun. 9, 2016

(87) PCT Pub. No.: WO2015/102447
PCT Pub. Date: Jul. 9, 2015

(65) Prior Publication Data
US 2016/0309390 A1    Oct. 20, 2016

Related U.S. Application Data

(60) Provisional application No. 61/923,751, filed on Jan. 5, 2014.

(51) Int. Cl.
*H04W 40/10* (2009.01)
*H04W 52/02* (2009.01)
(Continued)

(52) U.S. Cl.
CPC ....... *H04W 40/10* (2013.01); *H04W 52/0261* (2013.01); *H04W 40/04* (2013.01); *H04W 84/12* (2013.01); *Y02B 60/50* (2013.01)

(58) Field of Classification Search
CPC . H04W 40/10; H04W 52/0261; H04W 40/04; H04W 84/12; Y02B 60/50
(Continued)

(56) References Cited

U.S. PATENT DOCUMENTS

2006/0135143 A1* 6/2006 Suematsu ............. H04W 88/06
455/418
2010/0001870 A1* 1/2010 Hong ................. G01R 31/3606
340/636.1

FOREIGN PATENT DOCUMENTS

| WO | 2012-033248 A1 | 3/2012 |
| WO | 2012-093795 A2 | 7/2012 |
| WO | 2013-048199 A2 | 4/2013 |

OTHER PUBLICATIONS

Denzil Ferreira et al., "Understanding Human-Smartphone Concerns: A Study of Batter Life", Pervasive '11, Proceedings of the 9th international conference on Pervasive computing, pp. 19-33, San Francisco, CA, USA, Jun. 12, 2011, Springer. (http://dl.acm.org/citation.cfm?id=2021978) See section 3.3, 3.4.
(Continued)

*Primary Examiner* — Melvin Marcelo
*Assistant Examiner* — Natali N Pascual Peguero
(74) *Attorney, Agent, or Firm* — Dentons US LLP (57) ABSTRACT

A data transmission method of a terminal device according to an embodiment of the present invention may comprise the steps of: identifying a probability density function for battery consumption by time by accumulating information on a user's battery consumption pattern; identifying information on next charging time (T); identifying the battery depletion probability using the probability density function and the
(Continued)

next charging time (T); and transmitting data if the battery depletion probability is less than a predetermined threshold value.

6 Claims, 9 Drawing Sheets

(51) Int. Cl.
*H04W 40/04* (2009.01)
*H04W 84/12* (2009.01)

(58) Field of Classification Search
USPC .......................................................... 370/311
See application file for complete search history.

(56) References Cited

OTHER PUBLICATIONS

Earl Oliver et al., "An empirical approach to smartphone energy level prediction", UbiComp '11, Preceedings of the 13th international conference on Ubiquitous computing, pp. 345-354, Beijing, China, Sep. 17, 2011, ACM. (http://dl.acm.org/citation.cfm?id=2030159) See cols. 2, 10, 11; and figure 4.

* cited by examiner

DATA TRANSMISSION METHOD ACCORDING TO BATTERY USE PATTERN

This application is a National Stage Entry of International Application No. PCT/KR2015/000065, filed on Jan. 5, 2015, and claims the benefit of and priority to Provisional Application No. 61/923,751, filed Jan. 5, 2014, each of which are hereby incorporated by reference in their entirety for all purposes as if fully set forth herein.

BACKGROUND OF THE INVENTION

Field of the Invention

The present invention relates to a data transmission method for a mobile terminal, and more particularly, to a method and apparatus for a data transmission according to a battery use pattern.

Related Art

With the supply of mobile terminals such as smart phones over recent years, the energy consumption and low battery of mobile terminals becomes an important issue. According to this, a method of analyzing and utilizing a terminal energy use pattern of a user has been researched, such as transmitting data adaptively according to a delay-tolerance or scheduling tasks according to a power consumption. For example, by analyzing the energy use pattern of a smart phone of a user, the future energy remains are anticipated, and accordingly, the data of more delay-tolerance is transmitted or tasks are actively scheduled when there is spare energy. Otherwise, the data transmission or scheduling for the tasks is delayed as much as possible.

As one of the studies researched previous to the development of such algorithm, there is a study for a smart phone energy use pattern of a user [D. Ferreira, A. K. Dey and V. Kostakos, "Understanding Human-Smartphone Concerns: A Study of Battery Life," Pervasive 2011, LNCS 6696, pp. 19-33, 2011]. In this study, a developed application is installed on 4000 or more android smart phones, and energy remains of the smart phones are measured.

In addition, in another study [E. Oliver, and S. Keshav, "An Empirical Approach to Smartphone Energy Level Prediction," ACM UbiComp' 11, Sep. 17-21, 2011, Beijing, China], after measuring energy use patterns for 20,100 smart phone users, a simple algorithm is proposed to anticipate future battery remains by classifying the users. The algorithm proposed by the study uses a method of anticipating the future battery remains using an average battery discharge rate and a charging time of a user. As a result of simulation, the algorithm shows an accuracy of about 72%. Although there are studies for analyzing smart phone energy use patterns of users, there was no study or invention for opportunistic transmission of delay-tolerant data by utilizing the studies.

Meanwhile, in an environment in which heterogeneous networks are coexist such as a cellular network and a wireless LAN (Wi-Fi), there is a study that proposes an algorithm for determining on which network is selected by collectively considering a power consumption of a terminal and a delay time, when the terminal performs a uplink or downlink transmission of delay-tolerant data [M. Ra, J. Peak, A. Sharma, R. Govindan, M. Krieger, and M. Neely, "Energy-delay tradeoffs in smart phone applications," in Proc. of MobiSys, SF, Calif., USA, June 2010, pp. 255-270]. The study shows that the data transmission amount through the wireless LAN is three to four times greater than the data transmission amount through the cellular network in the case of consuming the same power amount. Meanwhile, in the algorithm, the fact that the wireless LAN may be usable intermittently only (e.g., in the case of meeting Wi-Fi access point) has been positively reflected.

According to this, since it is unable to use the wireless LAN in the case that the data delay time becomes elongated excessively, the data is transmitted through the cellular network in spite of consuming a lot of energy. Otherwise, in the case that there is the data delay time to spare, the data transmission is holding until it is available to access an energy efficient wireless LAN.

Although such a study proposes the algorithm of selecting an optimal network for transmitting data by considering energy efficiency so far as a delay of the data transmission is tolerant, the study did not consider current battery remains of a terminal. That is, in order to use the energy of terminal efficiently, the energy remains should be considered together with the delay-tolerance of data. That is, in the case that energy is in short, the data transmission should be able to be stopped even though the terminal meets an energy efficient wireless LAN.

However, studies and invention including the study above still do not consider the battery remains.

SUMMARY OF THE INVENTION

An aspect of the present invention, a method for a data transmission is provided. According to the method, data may be transmitted through an energy efficient network so far as a delay is permitted. In addition, according to the method, it is determined that the energy is enough by estimating the energy remains of the next charging time, and only in the case there is spare energy, data may be transmitted.

An aspect the present invention provides an opportunistic transmission method of delay-tolerant data by anticipating future battery remains of a user.

A method for transmitting data by a terminal according to an embodiment of the present invention may include deducting a probability density function for a battery remains depending on a time by accumulating information on a battery consumption pattern of a user, getting information on a next charging time T, calculating a battery depletion probability using the probability density function and the next charging time T, and transmitting data when the battery depletion probability is smaller than a predetermined threshold value.

According to an aspect of the present invention, a situation that a user undergoes due to the battery depletion of a terminal may be prevented.

DESCRIPTION OF EXEMPLARY EMBODIMENTS

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, the elements in the drawings described in the invention are independently drawn for the purpose of convenience for explanation of different distinctive functions and does not mean that the elements are embodied by independent hardware or independent software. For example, two or more elements of the elements may be combined to form a single element, or a single element may be divided into plural elements. The embodiments in which the elements are combined and/or divided belong to the scope of the invention without departing from the concept of the invention.

Hereinafter, exemplary embodiments of the invention will be described in more detail by reference to the accompanying drawings. Identical elements in the drawings will be referenced by the same reference numerals and will not be repeatedly described.

A user of a terminal such as a smart phone may perform uplink or downlink transmission of data. At the moment, each of the data has a deadline ($T_{deadline}$) to be transmitted. The user expects to transmit a delay-tolerant data as much as possible within a range that the energy of the terminal of its own by the user is not depleted.

An aspect the present invention provides an opportunistic transmission method of delay-tolerant data by anticipating future battery remains of a user. Further, in an aspect of the present invention, a primary object is not to bring inconvenience of a user by preventing a terminal from being depleted. And an object of the present invention is to transmit data as much as possible in a situation that the energy of the terminal is not depleted.

Hereinafter, a method for obtaining the probability of energy remaining until the next charging time and a method for determining the data transmission using this will be described in detail by using the battery use pattern of a user and the next charging time T.

Meanwhile, in the present invention, it is assumed that the pattern of battery consumption of a user may be learned by iterative learning and the next charging time may be learned by a user input. In order to anticipate the probability of energy depletion until the next charging time T after the user input, as assumed above, the pattern of battery consumption of a user during a specific time may be figured out by learning.

Figure 1:
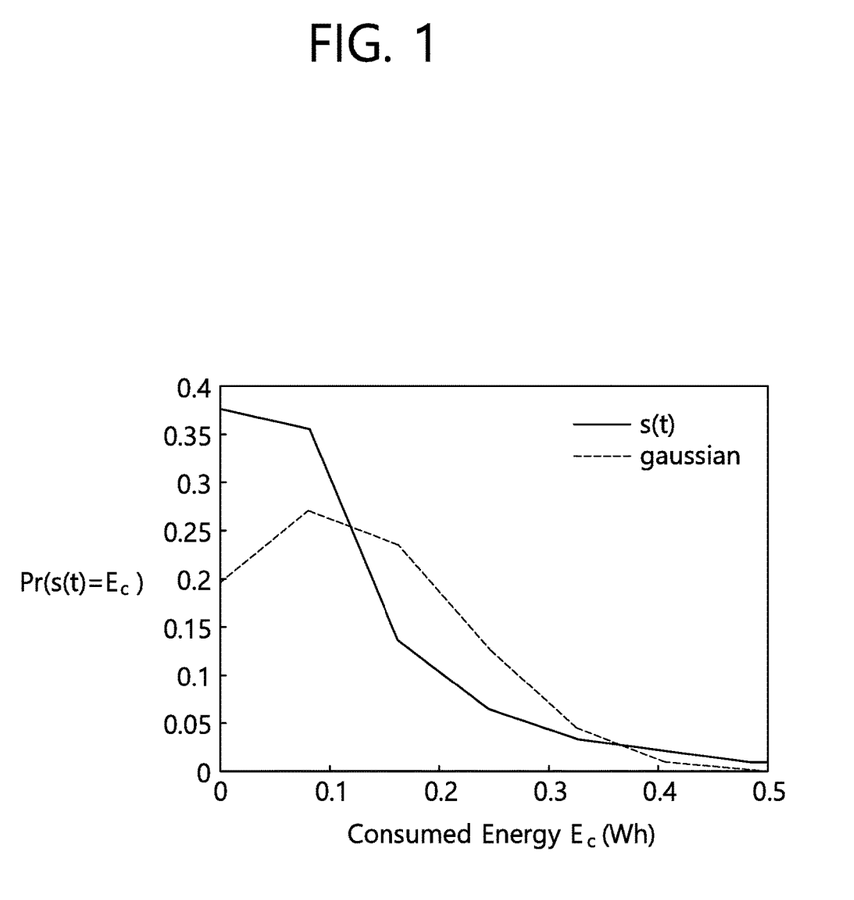
FIG. 1 shows the probability density function for battery consumption energy during thirty minutes.
Figure 2:
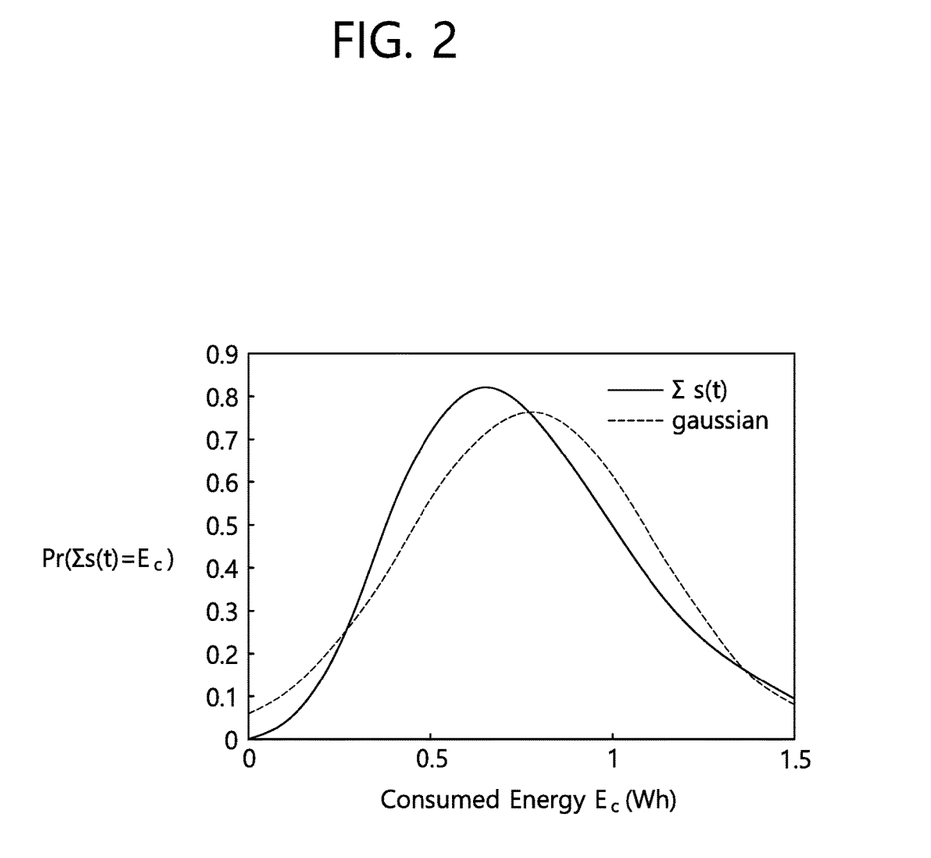
FIG. 2 shows the probability density function for battery consumption energy during four hours.
Figure 3:
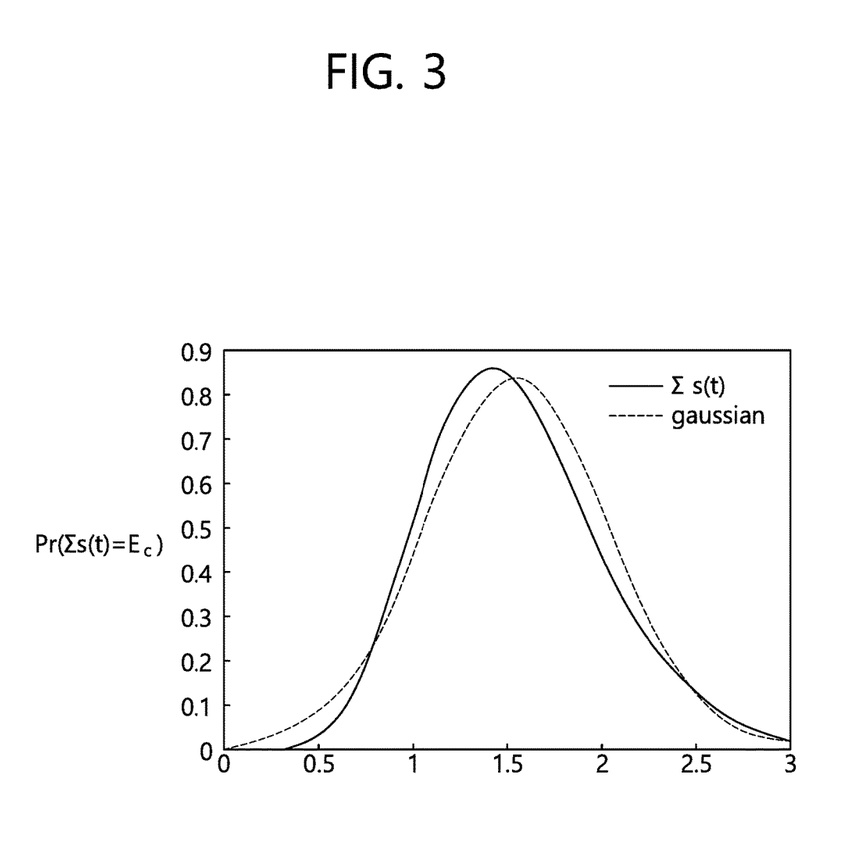
FIG. 3 shows the probability density function for battery consumption energy during eight hours.

FIGS. 1 to 3 are diagrams illustrating probability density functions according to battery consumption energy.

FIG. 1 shows the probability density function for battery consumption s(t) during thirty minutes, and FIG. 2 shows the probability density function for battery consumption s(t) during four hours. And FIG. 3 shows the probability density function for battery consumption s(t) during eight hours. FIGS. 1 to 3 show the probability density functions obtained based on direct measurements of the battery consumption done by a user using a specific terminal (Galaxy Note 2 made of Samsung Electronics Co., Ltd) for twenty days or more.

The solid lines in FIGS. 1 to 3 show the battery consumption s(t) during a specific time in the shape of the probability density function. Through these, the battery consumption pattern of the user may be learned. Further, the dotted lines in FIGS. 1 to 3 show the Gaussian distribution that has the same average value and the variance as the solid lines.

When the battery consumption is thirty minutes as shown in FIG. 1, the two curves of the solid lines and the dotted lines show relatively big differences. However, under the assumption that there is no correlation between the consecutive battery consumptions s(t), it is identified that the probability density function for the battery consumption during four hours and eight hours becomes very similar to the Gaussian distribution that has the same average value and the variance through FIG. 2 and FIG. 3. Accordingly, in the present invention, under the assumption that the distribution of the battery consumption of the terminal follows the Gaussian distribution, a probability of battery depletion may be anticipated.

In the case that the battery remains on a time t is represented by E(t) and the energy consumed when transmitting data through the cellular network (e.g., 3G mobile communication network) or the wireless LAN (Wi-Fi) on a single timeslot is represented by $E_t$, when the data transmission is tried, the battery depletion probability Pr of the terminal until the next charging time T may correspond to the probability that the battery remains on the next charging time T is smaller than the energy $E_t$ which is consumed when transmitting data ($Pr(E(T)<E_t)$).

In this case, a length of the timeslot used in defining $E_t$ is a value that may be configured according to a situation, which may be variable.

In the case that E(T) follows the Gaussian distribution which is the same average value and the variance for $$\sum_{\tau=current_{time}}^{T} S(\tau),$$

the battery depletion probability $Pr(E(T)<E_t)$ may be figured out.

In the case that the next battery charging time is T and the battery consumption until T, that is, the energy discharge amount is represented by $$\sum_{\tau=t}^{T} S(\tau),$$

the remaining energy E(T) of battery anticipated on T may be represented by Equation 1.

$$E(T) = E(t) - \sum_{\tau=t}^{T} s(\tau)$$ [Equation 1]

Figure 4:
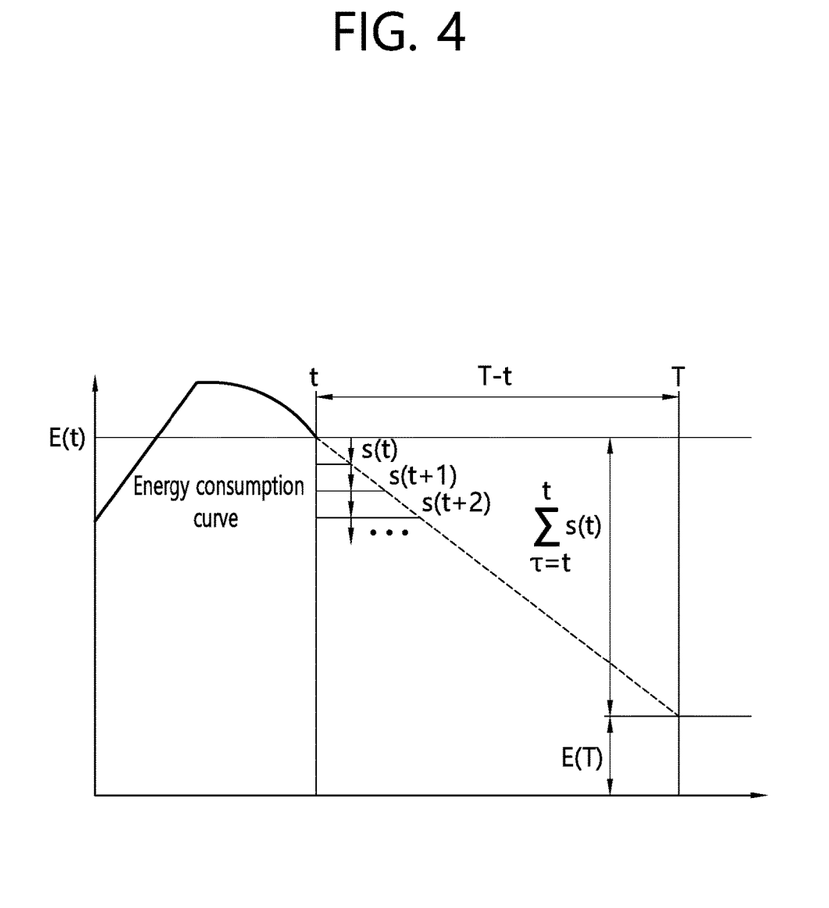
FIG. 4 is a diagram illustrating an energy consumption curve of a battery.

FIG. 4 is a diagram illustrating an energy consumption curve of a battery, that is, a graph illustrating an energy discharge amount and the remaining energy of the battery according to this.

When the information on the charging time T for charging battery next time is inputted from a user, the information $$\sum_{\tau=t}^{T} S(\tau)$$

on the energy discharge amount during t to T may be learned through the battery consumption curve by learning as shown in FIG. 4, and through this, the remaining energy in the battery on T may be figured out.

According to an aspect of the present invention, whether to transmit data from a terminal may be performed only when the battery depletion probability $Pr(E(T)<E_t)$ is smaller than a preconfigured threshold value $\epsilon$. That is, according to the algorithm of the present invention, only when the battery depletion probability until the next charging time is smaller than the threshold value $\epsilon$, it may be determined that there is spare remaining energy in the battery.

The threshold value $\epsilon$ is a configurable value configured by a user or when the terminal is manufactured, and may be set to a low value lest the battery of the terminal should be discharged as much as possible. The threshold value $\epsilon$ in the algorithm according to the present invention means a probability that permits the case of consuming more energy than that of budget until the next charging (or until the next scheduled time according to an energy use schedule).

Accordingly, when the threshold value $\epsilon$ is great, instead of transmitting energy by actively consuming the energy, the case that the battery of the terminal may be depleted or consumes more energy than that of being scheduled may be increased. Meanwhile, when the threshold value $\epsilon$ is small, instead of transmitting energy by relatively passively consuming the energy, the case that the battery of the terminal may be depleted or consumes more energy than that of being scheduled may be decreased.

A user may change or setup the threshold value $\epsilon$ according to his/her tendency of data transmission or characteristics. Conventionally, the threshold value $\epsilon$ may be set to a small value.

Meanwhile, the threshold value $\epsilon$ may be expressed as a function f depending on a mean arrival rate $\lambda$ of a delay-tolerant traffic of a user or a current energy amount E(t). The function f is a function of which output decreases depending on the mean arrival rate $\lambda$ of a delay-tolerant traffic, may be a function of which output increases depending on the current energy amount E(t). For example, the function f may be $f=k \exp(-\alpha\lambda)$, $f=c \log(-\beta E(t))$, or the like. In this case, $\alpha$, $\beta$, k or c is a constant.

In addition, according to the present invention, even though it is determined that there is spare energy in the battery, in the case that many times are remain until a transmission deadline $T_{deadline}$ of data, it is implemented that the data is transmitted through the energy efficient wireless LAN (Wi-Fi network).

The variable $T_s$ for determining an urgency of a data transmission on the current time t may be represented by Equation 2 below.

$$T_s = T_{deadline} - D(t)/r_{cellular}$$ [Equation 2]

In Equation 2, D(t) represents a remaining amount of data which is to be transmitted on a time t, and $r_{cellular}$ represents an average transmission speed of data through the cellular network. In Equation 2, $T_s$ is a time to start a data transmission, in the case that the data is transmitted through the cellular network only. That is, in order for the data to be successfully transmitted, the data transmission should be started on $T_s$ at the latest.

$r_{cellular}$ may be set to an average transmission speed of data through the network that consumes the greatest energy among the networks where the terminal is accessible presently, not the average transmission speed through the cellular network.

For example, in the case that the terminal is connected to a macro base station and a small cell base station, the average transmission speed of data through the macro base station may be set to $r_{cellular}$.

Otherwise, in the case that the terminal is available to access several networks, the concept of $r_{cellular}$ may be extended to a transmission speed for a network through which data is to be transmitted using the greatest energy.

The data transmission algorithm in which the deadline is considered may be arranged by Equation 3.

[Equation 3]

(a) $Pr(E(T) < E_t) < \epsilon$
  $t < T_s$ : Data is transmitted only when the data is available to be transmitted through the wireless LAN.
  $t \geq T_s$ : Data is transmitted through the wireless LAN when the data is available to be transmitted through the wireless LAN. Otherwise, the data is transmitted through the cellular network.
(b) $Pr(E(T) < E_t) \geq \epsilon$
  Data is not transmitted.

According to Equation 3, in the case (a) that the battery depletion probability until the next charging time T is smaller than the threshold value $\epsilon$, the terminal transmits the data using the wireless LAN only when it is available to transmit the data through the wireless LAN in the case that the current time t is smaller than $T_s$. And the terminal transmits the data using the cellular network in the case that the current time t is equal to or greater than $T_s$.

Meanwhile, in the case (b) that the battery depletion probability until the next charging time T is greater than the threshold value $\epsilon$, the terminal does not transmit the data.

That is, when there is spare energy, i.e., only when the battery depletion probability is small, the terminal transmits the data. And the terminal transmits the data only when it is available to access the wireless LAN, in the case that where is a time to spare until the deadline ($t<T_s$). Otherwise, the terminal transmits the data through the cellular network in the case that there is no time to spare until the deadline ($t \geq T_s$).

According to another embodiment of the present invention, when the current time is t, $Pr(E(T)<E_t)<\epsilon$ may be expressed by Equation 4 using the fact that E(T) follows the Gaussian distribution in $Pr(E(T)<E_t)<\epsilon$. And when applying the chernoff bound, which is a tight bound, in Equation 4, the battery depletion probability may be expressed by Equation 5.

$$\Pr(E(T) < E_t) < \varepsilon \rightarrow \qquad \text{[Equation 4]}$$

$$\Pr\left(E(t) - \sum_{\tau=t}^{T} s(\tau) < E_t\right) < \varepsilon \rightarrow \Pr\left(\sum_{\tau=t}^{T} s(\tau) > E(t) - E_t\right) < \varepsilon$$

$$\Pr\left(\sum_{\tau=t}^{T} s(\tau) > E(t) - E_t\right) < \min_{k}\left(E\left[e^{k\sum_{\tau=t}^{T} s(t)}\right]e^{-k(E(t)-E_t)}\right) = \qquad \text{[Equation 5]}$$

$$\min_{k}\left(e^{\frac{\sigma^2 k^2}{2} + (\mu - (E(t)-E_t))k}\right) = e^{-\frac{(E(t)-E_t-\mu)^2}{2\sigma^2}}$$

In Equation 4, μ means the average of $$\sum_{\tau=t}^{T} S(\tau),$$

and $\sigma^2$ represents the variance of $$\sum_{\tau=t}^{T} S(\tau).$$

M and $\sigma^2$ are values representing the battery depletion pattern of a terminal by a user, and may be obtained through a predetermined learning as described by reference to FIGS. 1 to 4.

In the proposed algorithm, the comparison of $\Pr(E(T) < E_t)$ with the threshold value ϵ may be replaced by the comparison of the calculated value $$\left(e^{-\frac{(E(t)-E_t-\mu)^2}{2\sigma^2}}\right)$$

of the right side of Equation 5, which is a tight bound of $\Pr(E(T)<E_t)$, with the threshold value ϵ.

In addition, the value $$\left(e^{-\frac{(E(t)-E_t-\mu)^2}{2\sigma^2}}\right)$$

of the right side of Equation 5 may be accurately obtained by the current battery energy amount E(t) of the terminal, the energy amount $E_t$ to be used for transmission and the learn battery depletion pattern μ and $\sigma^2$ of the user. Accordingly, the proposed algorithm according to Equation 3 may be described by Equation 6 below.

[Equation 6]

(a) $\left(e^{-\frac{(E(t)-E_t-\mu)^2}{2\sigma^2}}\right) < \varepsilon$ $t < T_s$: Data is transmitted only when the data is available to be transmitted through the wireless LAN.

$t \geq T_s$: Data is transmitted through the wireless LAN when the data is available to be transmitted through the wireless LAN. Otherwise, the data is transmitted through the cellular network.

(b) $\left(e^{-\frac{(E(t)-E_t-\mu)^2}{2\sigma^2}}\right) \geq \varepsilon$

Data is not transmitted.

Further, according to another example of the present invention, when N networks are existed, in the case that the networks are represented by NET1, NET2, ..., NETN in the ascending order from the network that has the smallest energy when transmitting data of the same bit, a plurality of $T_s$ values, used in Equation 4 and Equation 5 may be setup, not a single value.

In this case, it is also available to select the network that corresponds to a plurality of deadline values $T_{deadline}$. For example, several $T_s$ values may be setup such as $T_s$ (NETn)=$T_{deadline}$−D(t)/r_NETn, $T_s$ (NETn−1)=$T_{deadline}$−D(t)/r_(NETn−1), this may be generalized by Equation 7.

[Equation 7]

(a) $\Pr(E(T) < E_t) < \varepsilon$ $t < T_s$ (NET2) : Data is transmitted only when the data is available to be transmitted through $NET_1$.

$t \geq T_s$ (NET3) : Data is transmitted through $NET_1$ when the data is available to be transmitted through $NET_1$. Otherwise, the data is transmitted through $NET_2$ only when the data is available to be transmitted through $NET_2$.

...

$t \geq T_s$ (NETn) : Data is transmitted through the network that consumes the smallest energy among $NET_1$ to $NET_{n-1}$ when the data is available to be transmitted through $NET_1$ to $NET_{n-1}$. Otherwise, the data is transmitted through $NET_N$.

(b) $\Pr(E(T) < E_t) \geq \varepsilon$

Data is not transmitted.

Figure 5:
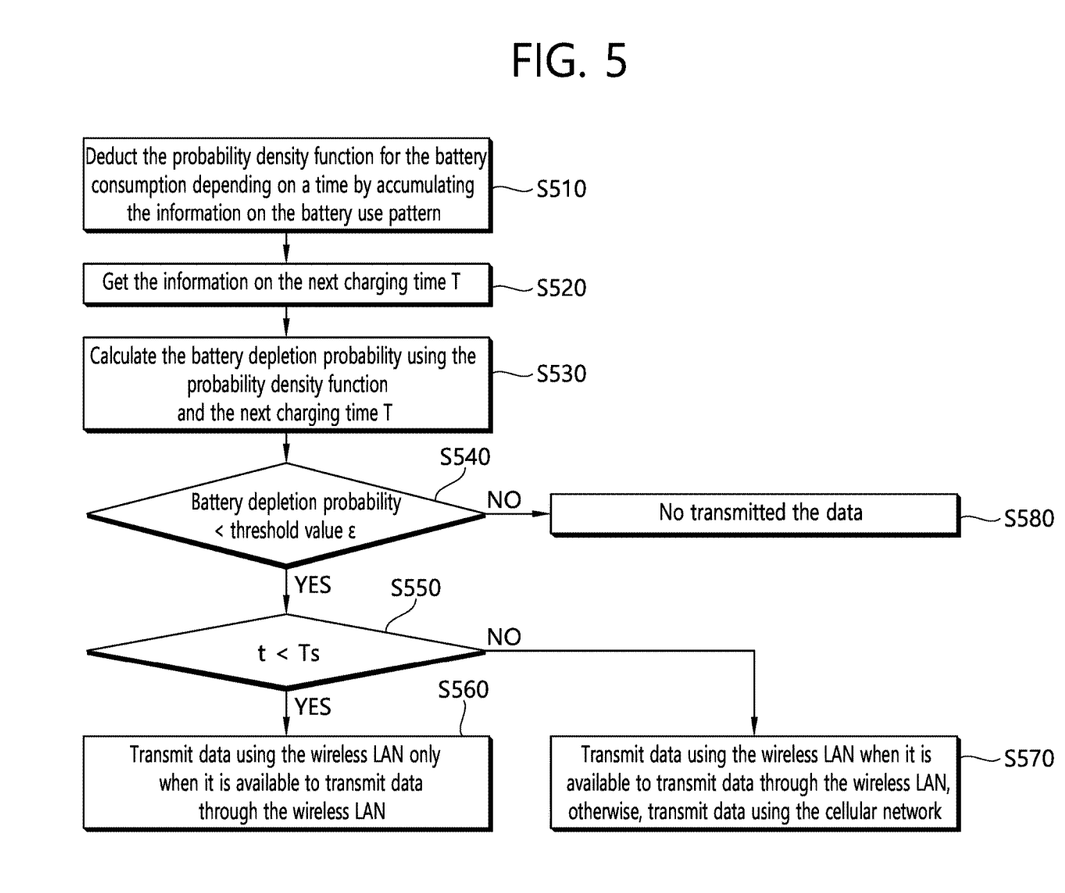
FIG. 5 is a flowchart for describing a data transmission method of a terminal according to an aspect of the present invention.

FIG. 5 is a flowchart for describing a data transmission method of a terminal according to an aspect of the present invention.

The method for anticipating the battery depletion probability may be performed or executed by a predetermined application, that is, the application program included in a terminal, or may be performed through a server that may be connected to the terminal or the application in other terminal. When the battery depletion probability is anticipated by other electronic device connected to the terminal, the probability information may be delivered to the terminal through a wired or wireless network.

First, the terminal may deduct the probability density function for the battery consumption depending on a time by accumulating the information on the conventional battery use pattern of a user (step, S510).

As such, when the probability density function for the battery consumption is deducted, the terminal may get the information on the next charging time T (step, S520).

The next charging time T may be setup by inputting an anticipation time to charge the battery next time through a user interface of the terminal by a user, and the terminal may figure out the inputted value as the next charging time T.

Otherwise, according to another example, the terminal may learn the distribution Y of the battery charging time of the user from a statistics. In this case, the terminal may use the lowest value or the average value T of the charging time, or may obtain the minimum time x* that satisfies the relation P(Y>x)<1−ϵ' for a target threshold value ϵ' and use the value as T.

Then, the terminal may calculate the battery depletion probability using the probability density function for the battery consumption and the next charging time T (step, S530).

After figuring out the battery depletion probability, the terminal may determine whether to transmit data depending of the fact that the battery depletion probability is smaller than a predetermined threshold value $\epsilon$ (step, S540).

As a result of the determination, when the battery depletion probability is smaller than the predetermined threshold value $\epsilon$, the terminal may select a network for the data transmission by considering the data transmission deadline that represents the urgency of data transmission (step, S550).

When the current time is smaller than the data transmission deadline, the terminal may transmit data using the wireless LAN only when it is available to transmit data through the wireless LAN (step, S560).

On the other hand, when the current time is equal to or greater than the data transmission deadline, the terminal may transmit data using the wireless LAN when it is available to transmit data through the wireless LAN. Otherwise, the terminal may transmit data using the cellular network (step, S570).

Meanwhile, when the battery depletion probability is equal to or greater than a predetermined threshold value $\epsilon$, the terminal may not transmit data (step, S580).

In addition, in the case that there are several networks, for example, three or more networks, for example, to which the terminal may access, the terminal may setup the data transmission deadline in the ascending order from the network that has the smallest energy, and may transmit data through the network that corresponds to the data transmission deadline.

Figure 6:
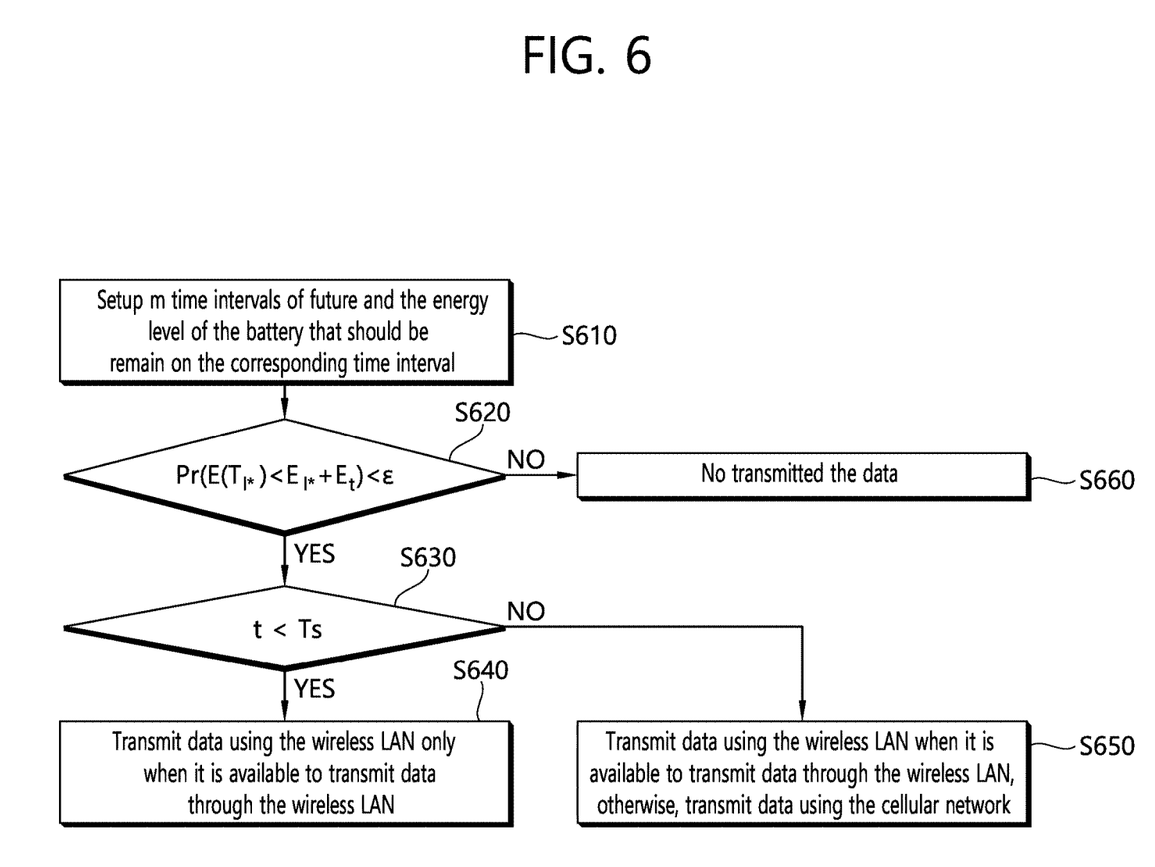
FIG. 6 is a control flowchart for describing a data transmission method of a terminal according to another aspect of the present invention.

FIG. 6 is a control flowchart for describing a data transmission method of a terminal according to another aspect of the present invention.

A user may have a particular energy use schedule for a terminal. For example, if there is the minimum energy remains in the terminal which is expected by the user on the time intervals m of future, the user may expect to use the energy based on the energy remains. That is, the user may have the energy budget which is determined on every interval by dividing the energy by time intervals, and may want to use the energy as much as the energy budget.

In order to consume the battery energy which is to be used in a data transmission effectively, the user may setup m time intervals $T_{1*}$ of future and the energy level $E_{1*}$ of the battery that should be remain on the corresponding time interval (step, S610).

The energy use schedule of the user may be expressed by m time intervals $T_1, T_2, \ldots, T_m$ ($0<T_1<T_2<\ldots<T_m$) and the energy remains $E_1, E_2, \ldots, E_m$ ($E(0)>E_1>E_2>\ldots>E_m>0$) of the battery of the terminal that corresponds to the time.

When the energy use schedule which is the nearest after the current time is referred to 1*, 1* may be expressed.

It is presumed that the terminal may figure out the battery depletion probability as shown in FIG. 5.

In order to preserve the energy more than $E_{1*}$ during the current time t to the time $T_{1*}$, the terminal determines whether the probability that the energy $E(T_{1*})$ remained on the time $T_{1*}$ is smaller than the energy level $E_{1*}$ set by the user plus the transmission energy $E_t$ is smaller than a predetermined threshold value $\epsilon$ (step, S620).

As a result of the determination, when the probability that the energy $E(T_{1*})$ remained on the time $T_{1*}$ is smaller than the energy level $E_{1*}$ plus the transmission energy $E_t$ is smaller than the predetermined threshold value $\epsilon$, the terminal may select a network for the data transmission by considering the data transmission deadline according to the urgency of data transmission (step, S630).

When the current time is smaller than the data transmission deadline, the terminal may transmit data using the wireless LAN only when it is available to transmit the data through the wireless LAN (step, S640).

On the other hand, when the current time is equal to or greater than the data transmission deadline, the terminal may transmit data using the wireless LAN when it is available to transmit data through the wireless LAN. Otherwise, the terminal may transmit data using the cellular network (step, S650).

Meanwhile, when the probability that the energy $E(T_{1*})$ is smaller than the energy level $E_{1*}$ plus the transmission energy $E_t$ is smaller than the predetermined threshold value $\epsilon$, the terminal may not transmit data (step, S660).

According to FIG. 6, for each time interval, the battery use schedule (time, energy remains) of the nearest future of the user may be probabilistically guaranteed.

Steps S630 to S650 in FIG. 6 may be expressed mathematically as follows.

[Equation 8]

※ Definition of symbol
$1^* = \arg\min_{1 \in (1, 2, \ldots, m)}(\{T_1\})$ s.t. $T_1 > t$ (a)
$$\Pr(E(T_{1*}) < E_{1*} + E_t) < \varepsilon \rightarrow \left(e^{-\frac{(E(t)-E_t-\mu)^2}{2\sigma^2}}\right) < \varepsilon$$

$t < T_s$: Data is transmitted only when the data is available to be transmitted through the wireless LAN.
$t \geq T_s$: Data is transmitted through the wireless LAN when the data is available to be transmitted through the wireless LAN. Otherwise, the data is transmitted through the cellular network.

(b)
$$\Pr(E(T_{1*}) < E_{1*} + E_t) \geq \varepsilon \rightarrow \left(e^{-\frac{(E(t)-E_t-\mu)^2}{2\sigma^2}}\right) \geq \varepsilon$$

Data is not transmitted.

Figure 7:
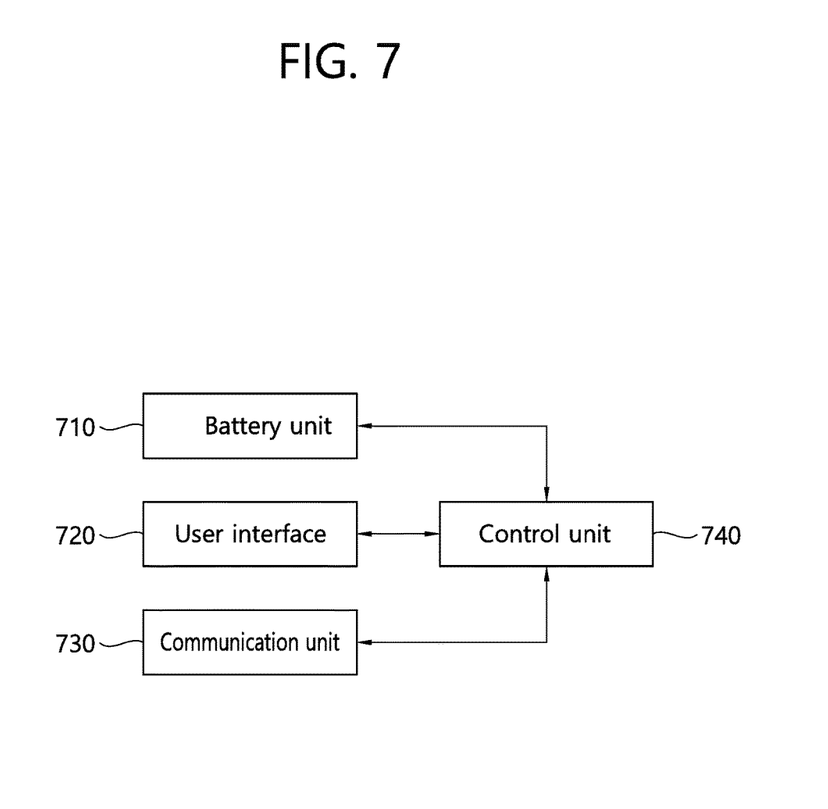
FIG. 7 is a control block diagram of a terminal according to an aspect of the present invention.

FIG. 7 is a control block diagram of a terminal according to an aspect of the present invention.

As shown in FIG. 7, a terminal includes a battery unit 710, a user interface 720, a communication unit 730 and a control unit 740 configured to control these.

A user may input the information on the next charging time T through the user interface, and may input the information on the m time intervals $T_{1*}$ of future and the energy level $E_{1*}$ of the battery that should be remained on the corresponding time interval.

The control unit 740 may accumulate the information on the battery consumption pattern of the user and may deduct the probability density function on the battery consumption.

In addition, the control unit 740 may figure out the battery depletion probability using the probability density function and the next charging time T which is inputted through the user interface 720. The control unit 740 may transmit data through the communication unit 730 when the battery depletion probability is smaller than a predetermined threshold value.

The information on the next charging time T may be setup according to an arbitrary condition, not inputted by the user.

The probability density function may follow the Gaussian distribution curve.

The control unit 740 may determine the network to transmit data based on the data transmission deadline that represents an urgency of the data transmission.

For example, when the current time is smaller than the data transmission deadline, the control unit 740 may transmit data through the wireless LAN. Otherwise, when the current time is equal to or greater than the data transmission deadline, the control unit 740 may transmit data through the wireless LAN or the cellular network.

In the case that the information on the m time intervals $T_{1*}$ of future and the energy level $E_{1*}$ of the battery that should be remained on the corresponding time interval is received from the user, the control unit 740 may setup the battery depletion probability to be the probability that the energy $E(T_{1*})$ remained on the time $T_{1*}$ is smaller than the energy level $E_{1*}$ set by the user plus the transmission energy $E_t$.

In order to verify the performance of the data transmission method according to an aspect of the present invention, simulations have been performed using specific terminals (the first terminal Galaxy Note 2 made of Samsung Electronics Co., Ltd. and the second terminal Optimus lte2 made of kg Electronics). By using two terminals, the battery remains of the terminals has been actually measured for twenty days, and the proposed algorithm described above has been tested using the recorded information on the battery remains.

In the proposed data transmission method, the threshold value $\epsilon$ is set to 0.01 and 0.005. This means that the data transmission is allowed only when the battery depletion probability is smaller than 1% and 0.5%. The comparison data transmission method compared to the data transmission method proposed in the present invention is a method that while data is transmitted only when it is available to access the wireless LAN (Wi-Fi), data is transmitted through the cellular network when the current time becomes greater than $T_s$. Since the comparison data transmission method corresponds to a method of using energy as little as possible when transmitting the same amount of data, the method may be called an energy-minimal method.

Figure 8:
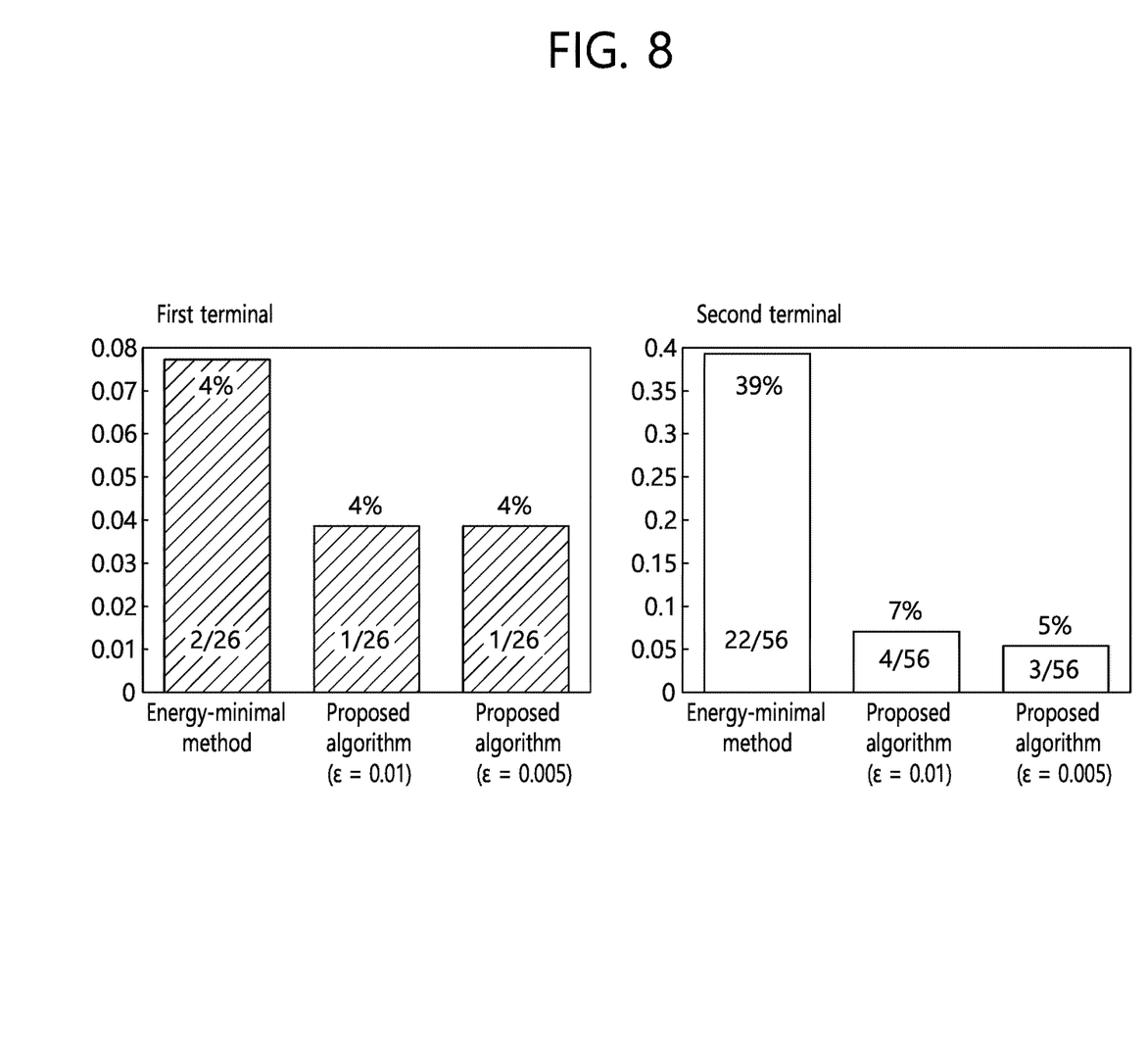
FIG. 8 is a diagram illustrating a probability of complete depletion of battery according to a data transmission method according to an aspect of the present invention.

FIG. 8 is a diagram illustrating a probability of complete depletion of battery according to a data transmission method according to an aspect of the present invention.

As shown in FIG. 8, when transmitting data according to the algorithm proposed in the present invention, in the case of the first terminal, the battery is depleted for only one case among twenty six cases, and in the case of the second terminal, the battery is depleted for maximum four cases among fifty six cases.

In comparison with this, when using the energy-minimal method, in the case of the first terminal, the battery is depleted for two cases among twenty six cases, and in the case of the second terminal, the battery is depleted for as many as twenty two cases among fifty six cases. That is, in the case of transmitting data using the energy-minimal method, the battery is completely depleted for two to eight times the cases of using the algorithm according to the present invention.

The complete depletion of battery means that the possibility of causing inconveniences increases when using the terminal by the user owing to the data transmission.

Figure 9:
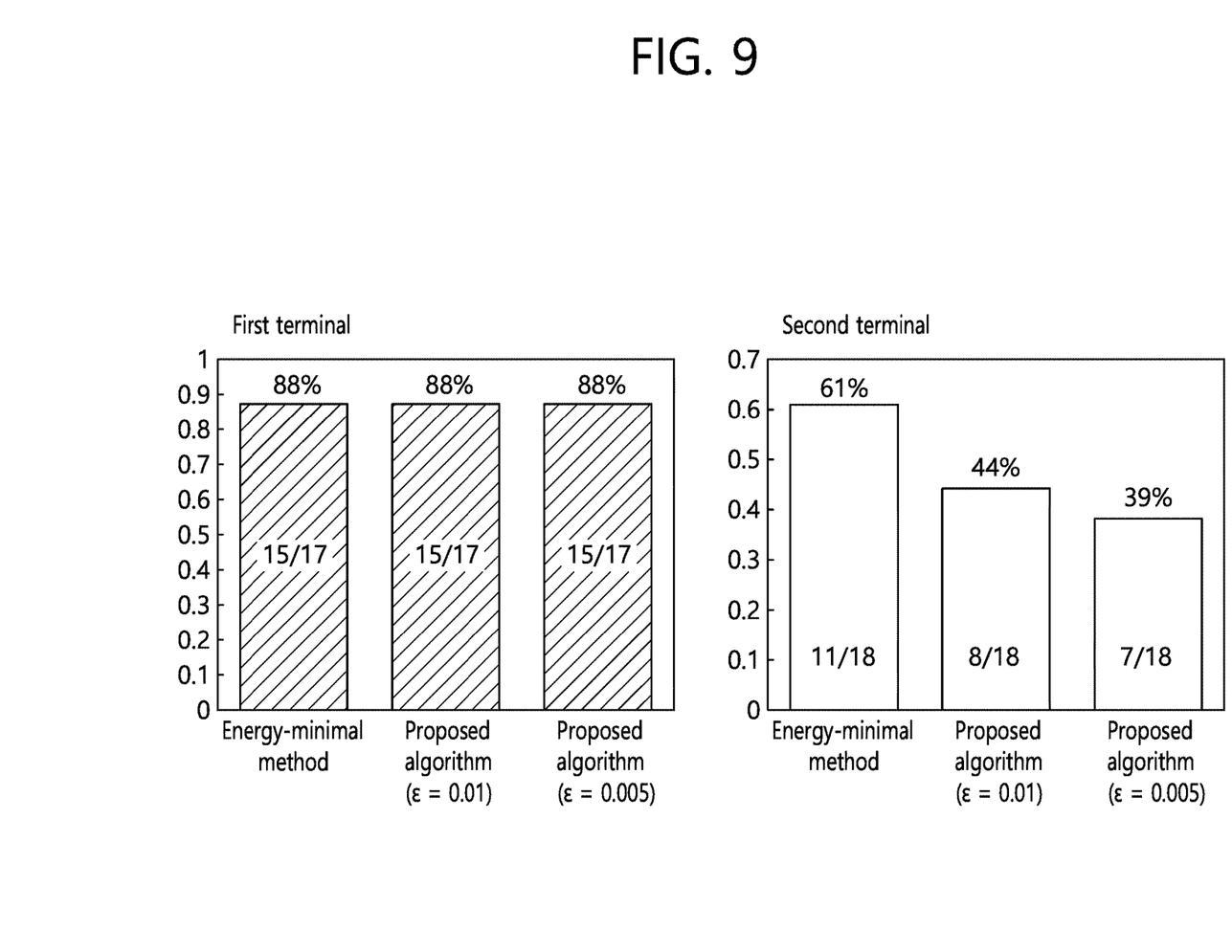
FIG. 9 is a diagram illustrating the probability of successful data transmission when using the data transmission method according to an aspect of the present invention.

FIG. 9 is a diagram illustrating the probability of successful data transmission when using the data transmission method according to an aspect of the present invention.

As shown in FIG. 9, when transmitting data in the first terminal, the data transmission is completed for the same case count in the case of using both of the algorithm according to the present invention and the energy-minimal method.

When transmitting data in the second terminal, the data transmission is completed for eleven cases in the case of using the energy-minimal method, and the data transmission is completed for seven and eight cases in the case of using the algorithm according to the present invention. The probability of completing data transmission shows higher for the case of following the existing energy-minimal method than for the case of following the algorithm according to the present invention. However, as shown in FIG. 9, considering that the battery depletion occurs for twenty two cases when using the energy-minimal method, the propose algorithm is more effective.

As described above, when configuring transmission schedule of delay-tolerant data, the present invention proposes the method of using the battery remains of the current terminal and the battery depletion pattern of a terminal user, which were not considered by the existing studies. More particularly, by calculating mathematically the probability $Pr(E(T) < E_0)$ of complete depletion of a battery until the next charging time, the data transmission is controlled such that the delay-tolerant data is transmitted only when the probability is smaller than $\epsilon$, which is a value that the user may set personally, thereby preventing the user of the terminal from undergoing inconvenience due to the battery depletion.

In addition, even though the probability of complete depletion of the battery is smaller than the designated value, the data may be transmitted through the energy efficient wireless LAN so far as there is energy to spare by the transmission deadline of data ($t < T_s$).

Accordingly, data may be transmitted by the transmission deadline as much as possible while utilizing the energy efficiently, according to the proposed method. Comparing the proposed method with the method of transmitting data through the wireless LAN only as much as possible without considering the energy remains in the terminal, it may be noticed that similar data amount (minimum 75% or more) may be transmitted while decreasing the probability of battery depletion of the terminal, referring to FIGS. 8 and 9.

In the above exemplary embodiments, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method for transmitting data by a terminal, comprising:
   deducting a probability density function for a battery remains depending on a time by accumulating information on a battery consumption pattern of a user;
   getting information on a next charging time T;
   calculating a battery depletion probability using the probability density function and the next charging time T; and
   when the battery depletion probability is smaller than a predetermined threshold value:
      determining a network to transmit the data based on a data transmission deadline that represents an urgency of the data transmission; and
      transmitting data through the determined network,
   wherein the data is transmitted through a wireless LAN when a current time is smaller than the data transmission deadline, and the data is transmitted through a cellular network when a current time is equal to or greater than the data transmission deadline.

2. The method for transmitting data of claim 1, wherein the probability density function follows Gaussian distribution curve.

3. The method for transmitting data of claim 1, further comprising:
   receiving information on m time intervals T1* of future and an energy level E1* of the battery that should be remained on the corresponding time interval.

4. The method for transmitting data of claim 3, wherein the battery depletion probability is setup as a probability that the energy E(T1*) remained on the time T1* is smaller than the energy level E1* set by the user plus the transmission energy Et.

5. A terminal, comprising:
   a battery unit;
   a communication unit; and
   a control unit that performs:
      deducting a probability density function for a battery remains depending on a time by accumulating information on a battery consumption pattern of a user,
      getting information on a next charging time T,
      calculating a battery depletion probability using the probability density function and the next charging time T, and
      when the battery depletion probability is smaller than a predetermined threshold value:
         determining a network to transmit the data based on a data transmission deadline that represents an urgency of the data transmission; and
         transmitting data through the determined network,
      wherein the data is transmitted through a wireless LAN when a current time is smaller than the data transmission deadline, and the data is transmitted through a cellular network when a current time is equal to or greater than the data transmission deadline.

6. The terminal of claim 5, further comprising a user interface configured to receive a user input for the next charging time T.

* * * * *